F. R. SIMMS.
FLEXIBLE COUPLING.
APPLICATION FILED MAR. 4, 1920.
1,345,896.
Patented July 6, 1920.
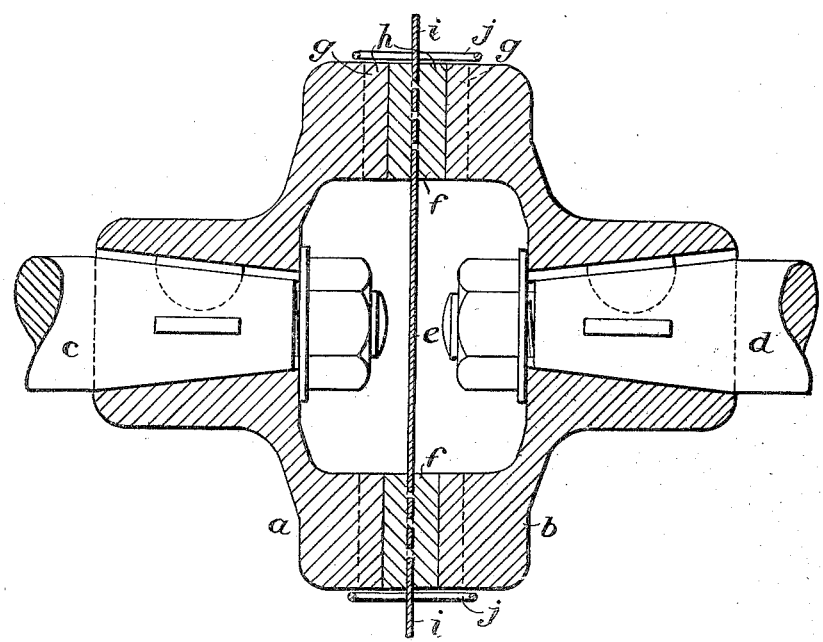
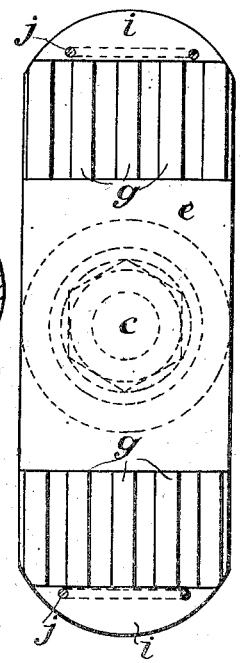
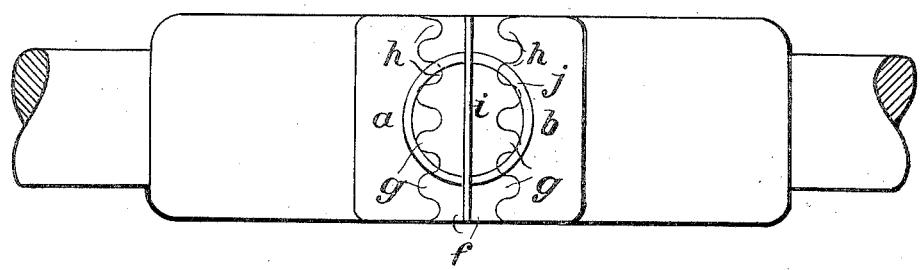
Inventor
Frederick R. Simms
By
George A. Penrod
atty

UNITED STATES PATENT OFFICE.

FREDERICK RICHARD SIMMS, OF LONDON, ENGLAND, ASSIGNOR OF ONE-HALF TO SIMMS MOTOR UNITS LIMITED, OF LONDON, ENGLAND.

FLEXIBLE COUPLING.

1,345,896.  Specification of Letters Patent.  Patented July 6, 1920.

Application filed March 4, 1920. Serial No. 363,216.

*To all whom it may concern:*

Be it known that I, FREDERICK RICHARD SIMMS, a subject of the King of Great Britain, residing at Percy Buildings, Gresse street, Rathbone Place, London, England, have invented new and useful Improvements in Flexible Couplings, of which the following is a specification.

This invention relates to improvements in flexible couplings, such as are sometimes interposed between the gear-box and the driving axle of a motor road vehicle.

A flexible coupling according to the invention comprises two halves or parts, which are keyed respectively to the meeting ends of the two shafts to be connected, and an intermediate member interposed between these two parts and designed to provide the requisite flexibility. This member is composed of a strip of leather or other suitable material, preferably of an approximately rectangular shape, embedded at or near each end in a block of a resilient material, preferably soft rubber, so that a pad of resilient material is thereby provided on each side of the strip at each end thereof. The face of each of these parts is formed with corrugations, teeth or the equivalent which are designed to engage with corresponding corrugations or the like in the face of the coupling half with which it contacts.

The leather strip is made of a length such that it projects at each extremity beyond the ends of the coupling halves, and, when the coupling is assembled, a metal ring is passed through each projecting portion adjacent to the coupling so as to prevent the resilient member working out of position. When it is desired to detach the said member from the coupling it is merely necessary to remove one of the locking rings to permit of the leather strip, with the pad, being pulled or drawn out in the direction of its length.

To enable the invention to be fully understood, I will describe it by reference to the accompanying drawing, in which:—

Figure 1 is a sectional elevation of a flexible coupling constructed according to the invention.

Fig. 2 is a plan view thereof, and

Fig. 3 is a face view of one half or part of the coupling removed.

$a$ and $b$ indicate the two halves or parts of the coupling which parts are keyed respectively to the two meeting ends $c$ and $d$ of the two shafts to be coupled. $e$ is the strip of leather or other suitable material composing the intermediate member, and $f$ indicates the block of soft rubber or other resilient material in which each end of the said strip $e$ is embedded, and which thus forms a pad on either side of the stid strap at either end thereof. As clearly seen in the drawing, each face of each of the pads $f$ is formed with corrugations or teeth $g$, these teeth engaging with corresponding teeth $h$ provided on the opposing faces of the coupling halves or parts $a$ and $b$.

As above described and as will be seen from the drawing, the strip $e$ is made of such a length that each end $i$ projects beyond that coupling $a$, $b$ and each of the projecting portions $i$ is formed with holes adjacent to the surface of the coupling, through which is passed a metal ring $j$; these rings constitute means for preventing the strip $e$ from working longitudinally out of position. By removing either of the rings $j$ from the strip $e$, the latter with the pad, can be pulled or drawn out from the coupling in the direction of its length, when desired.

Claims:

1. A shaft coupling comprising two members secured respectively to the shafts to be connected and each provided with a series of parallel teeth, the teeth of one member being oppositely disposed to the teeth of the other member; an intermediate member interposed between said members and provided on its opposite sides with series of parallel teeth which engage the teeth of the first members, and means for locking the intermediate member in position.

2. A coupling of the kind defined by claim 1 in which the intermediate member extends outwardly beyond the first two members, and the locking means engages the outwardly extending portions of the intermediate member.

3. A coupling of the kind defined by claim 1 in which the intermediate member is formed of flexible material and has extending members projecting outwardly beyond the first two members, and the locking means engages the extending members.

4. A shaft coupling comprising two coupling members secured respectively to the shafts to be connected and provided with teeth, the teeth of the coupling members extending parallel to each other, an intermediate member interposed between said coupling members and provided with parallel teeth which engage the teeth of the coupling members and means for locking the intermediate member in position.

5. A shaft coupling comprising two coupling members secured respectively to the shafts to be connected and each provided with a series of parallel teeth, the teeth of one coupling member being parallel to the teeth of the other coupling member, a flexible intermediate member interposed between said coupling members and provided with parallel teeth which mesh with the teeth of coupling members, said intermediate member being adapted to be disengaged from the coupling members by bodily movement in a plane parallel to the longitudinal axis of the teeth, projecting members extending from the intermediate member and projecting outwardly beyond the coupling members, and locking means engaging the projecting members for normally preventing bodily movement of the intermediate member.

6. A shaft coupling comprising two coupling members secured respectively to the ends of the shafts to be connected and each provided with a series of teeth, a yielding intermediate member connecting the coupling members and provided with teeth which engage the teeth of the coupling members, projecting members extending outwardly from the intermediate member, and locking means engaging the projecting members.

7. A coupling of the kind defined by claim 6 in which the projecting members form part of a strip of material which is embedded in the yielding member.

FREDERICK RICHARD SIMMS.